US011310955B2

(12) United States Patent
Ruppert et al.

(10) Patent No.: US 11,310,955 B2
(45) Date of Patent: Apr. 26, 2022

(54) PNEUMATIC CONVEYING SYSTEM FOR AN AGRICULTURAL PRODUCT APPLICATOR

(71) Applicant: CNH Industrial Canada, Ltd., Saskatoon (CA)

(72) Inventors: Rex Ruppert, Benson, MN (US); Joel Denis, Saskatoon (CA); Martin J. Roberge, Saskatoon (CA)

(73) Assignee: CNH Industrial Canada, Ltd., Saskatoon (CA)

( * ) Notice: Subject to any disclaimer, the term of this patent is extended or adjusted under 35 U.S.C. 154(b) by 349 days.

(21) Appl. No.: 16/514,386

(22) Filed: Jul. 17, 2019

(65) Prior Publication Data

US 2021/0015030 A1 Jan. 21, 2021

(51) Int. Cl.
*A01C 15/04* (2006.01)
*B05B 15/65* (2018.01)
(Continued)

(52) U.S. Cl.
CPC ............. *A01C 15/04* (2013.01); *A01M 9/003* (2013.01); *B05B 12/02* (2013.01); *B05B 15/65* (2018.02);
(Continued)

(58) Field of Classification Search
CPC ......... A01C 15/04; A01C 7/081; E01C 19/20; E01C 19/205; B05B 15/65; B05B 12/02;
(Continued)

(56) References Cited

U.S. PATENT DOCUMENTS 4,744,520 A * 5/1988 Widmer ................. A01C 15/04
239/654
4,790,484 A * 12/1988 Wall ....................... A01C 15/04
239/655

(Continued)

FOREIGN PATENT DOCUMENTS

| | | |
|---|---|---|
| CA | 2 809 692 | 2/2015 |
| EP | 0 457 743 | 11/1991 |

OTHER PUBLICATIONS

John Deere Owners Manual for OMLVU23475_I07; Nov. 7, 2018; 29 pages; available at: http://manuals.deere.com/cceomview/OMLVU16378_G5/Output/OMLVU16738_G56.html.

*Primary Examiner* — Steven J Ganey
(74) *Attorney, Agent, or Firm* — Rebecca L. Henkel; Rickard K. DeMille

(57) ABSTRACT

The invention provides a pneumatic conveying system for an agricultural product applicator, which system comprises multiple fans configured to serve separate boom sections of the applicator to more efficiently conduct airflow with respect to each section. In aspects of the invention, multiple centrifugal fans of the same or similar size can be used, or multiple centrifugal fans of various sizes can be used, such as one or more larger fans and one or more smaller fans. Exemplar aspects could include three small or medium sized centrifugal fans, four small or medium sized centrifugal fans, and five small or medium sized centrifugal fans, thereby allowing the system to raise outlet air pressure at an elevated flow. Another aspect of the invention could include configuring one fan to supercharge another fan, in series, also allowing the system to raise outlet air pressure at an elevated flow.

18 Claims, 8 Drawing Sheets

(51) Int. Cl.

| | |
|---|---|
| ***B05B 12/02*** | (2006.01) |
| ***A01M 9/00*** | (2006.01) |
| *A01C 7/08* | (2006.01) |
| *B05B 1/20* | (2006.01) |

(52) U.S. Cl.
CPC ................ *A01C 7/081* (2013.01); *B05B 1/20* (2013.01); *B60G 2300/08* (2013.01); *B60G 2300/083* (2013.01)

(58) Field of Classification Search
CPC ...... A01M 9/00; A01M 9/0007; A01M 9/003; A01M 7/0071; B60G 2300/08; B60G 2300/083
USPC ...................... 239/77, 650, 654, 655; 406/39
See application file for complete search history.

(56) References Cited

U.S. PATENT DOCUMENTS

| | | | |
|---|---|---|---|
| 5,102,203 | A | 4/1992 | Tierney |
| 5,224,044 | A | 6/1993 | Tamura et al. |
| 5,463,551 | A | 10/1995 | Milunas |
| 5,682,958 | A | 11/1997 | Kalhorn et al. |
| 5,802,489 | A | 9/1998 | Orbach et al. |
| 6,085,138 | A | 7/2000 | Smith et al. |
| 6,666,279 | B2 | 12/2003 | Scarlett et al. |
| 7,853,389 | B2 | 12/2010 | Luehrsen et al. |
| 9,037,341 | B2 | 5/2015 | James et al. |
| 9,631,345 | B2 | 4/2017 | Tanaka et al. |
| 9,795,079 | B2 | 10/2017 | Roberge et al. |
| 9,956,874 | B2 | 5/2018 | Velde et al. |
| 10,053,100 | B2 | 8/2018 | Foster et al. |
| 10,085,375 | B2 | 10/2018 | Noyer et al. |
| 2005/0087378 | A1 | 4/2005 | Hrazdera |
| 2008/0257569 | A1 | 10/2008 | Foster et al. |
| 2016/0128270 | A1 * | 5/2016 | Ruppert ................ A01C 7/102 239/68 |
| 2017/0008504 | A1 | 1/2017 | Woopen et al. |
| 2018/0111625 | A1 | 4/2018 | James et al. |

* cited by examiner

PNEUMATIC CONVEYING SYSTEM FOR AN AGRICULTURAL PRODUCT APPLICATOR

FIELD OF THE INVENTION

The present invention pertains to agricultural equipment and, more specifically, to a pneumatic conveying system for an agricultural product applicator, such as a planter or fertilizer applicator, that utilizes a plurality of fans for entraining particulate material in an airflow in one or more supply lines leading to a plurality of boom sections having nozzles for distributing the particulate material to the ground.

BACKGROUND OF THE INVENTION

Agricultural product delivery systems are known to utilize various mechanisms, including mechanical and pneumatic systems to move granular or particulate material or product, such as fertilizer, seed, insecticide or herbicide, from a product supply chamber, through a series of elongated tubes that extend from a product supply chamber to a product applicator, and placing the product on, or in growing medium, such as soil. Such agricultural product delivery systems are commonly employed in planters, air drills, fertilizer and pesticide applicators and a variety of other agricultural implements.

Moving the granular material takes a considerable amount of air volume. Product delivery systems typically use one or two centrifugal fans to produce the amount of air required for an entire boom system of a particular machine. However, demand for machines to apply product to larger areas and/or at faster speeds in a single pass typically requires producing substantially more airflow for wider booms and/or distributing the granular material through booms at higher rates. It is desirable, therefore, to provide an improved agricultural product conveying system that provides airflow sufficient to accommodate applications for such larger areas and/or faster speeds.

SUMMARY OF THE INVENTION

The invention provides a pneumatic conveying system for an agricultural product applicator, which system comprises multiple fans configured to serve separate boom sections of the applicator to more efficiently conduct airflow with respect to each section. In aspects of the invention, multiple centrifugal fans of the same or similar size can be used, or multiple centrifugal fans of various sizes can be used, such as one or more larger fans and one or more smaller fans. Exemplar aspects could include three small or medium sized centrifugal fans, four small or medium sized centrifugal fans, and five small or medium sized centrifugal fans, thereby allowing the system to raise outlet air pressure at an elevated flow. Another aspect of the invention could include configuring one fan to supercharge another fan, in series, also allowing the system to raise outlet air pressure at an elevated flow.

With centrifugal fans, as pressure goes up, air volume goes down. Therefore, as more pressure is required, the fan puts out less volume of air. To achieve proper fertilizer flow at maximum throughput, one to four additional fans, of the same size or various sizes in combination, can be used to attain optimum air pressure with an optimum amount of air flow.

Using a plurality of fans advantageously allows production of more stable air flow and pressure. If fan speed changes, or if an air leak exists in the system, more fans being used in this way can help stabilize or reduce the amount of change in air flow and pressure than would a singular fan. This is caused by a desire to divide air flow equally from one air source to several lines. An increase in the number of lines fed by a single air source can result in an increased probability that the airflow will not stabilize under certain conditions, such as during sectional control and/or turning compensation.

Specifically, then, one aspect of the invention can provide a pneumatic conveying system for an agricultural product applicator. The pneumatic conveying system can include: multiple fans, each fan being configured to generate an airflow; multiple supply lines, each supply line being configured to receive an airflow from a given fan and entrain particulate material in the airflow; and multiple boom sections, each boom section being connected to a supply line for receiving an airflow and entrained particulate material. Each boom section can include multiple nozzles for distributing the particulate material to the ground.

Another aspect of the invention can include a pneumatic conveying system having: multiple fans, each fan being configured to generate an airflow, each fan being in series with one another; a supply line, the supply line being configured to receive airflow from the fans and entrain particulate material in the airflow; and multiple boom sections, each boom section being connected to the supply line for receiving the airflow and entrained particulate material. Each boom section can include multiple nozzles for distributing the particulate material to the ground.

Other aspects, objects and advantages of the invention will be apparent from the following detailed description and accompanying drawings of exemplary embodiments.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

While the invention is described herein in connection with certain preferred embodiments, there is no intent to limit it to those embodiments. On the contrary, the intent is to cover all alternatives, modifications and equivalents within the spirit and scope of the invention as defined by the appended claims.

DETAILED DESCRIPTION OF THE INVENTION

Figure 1:
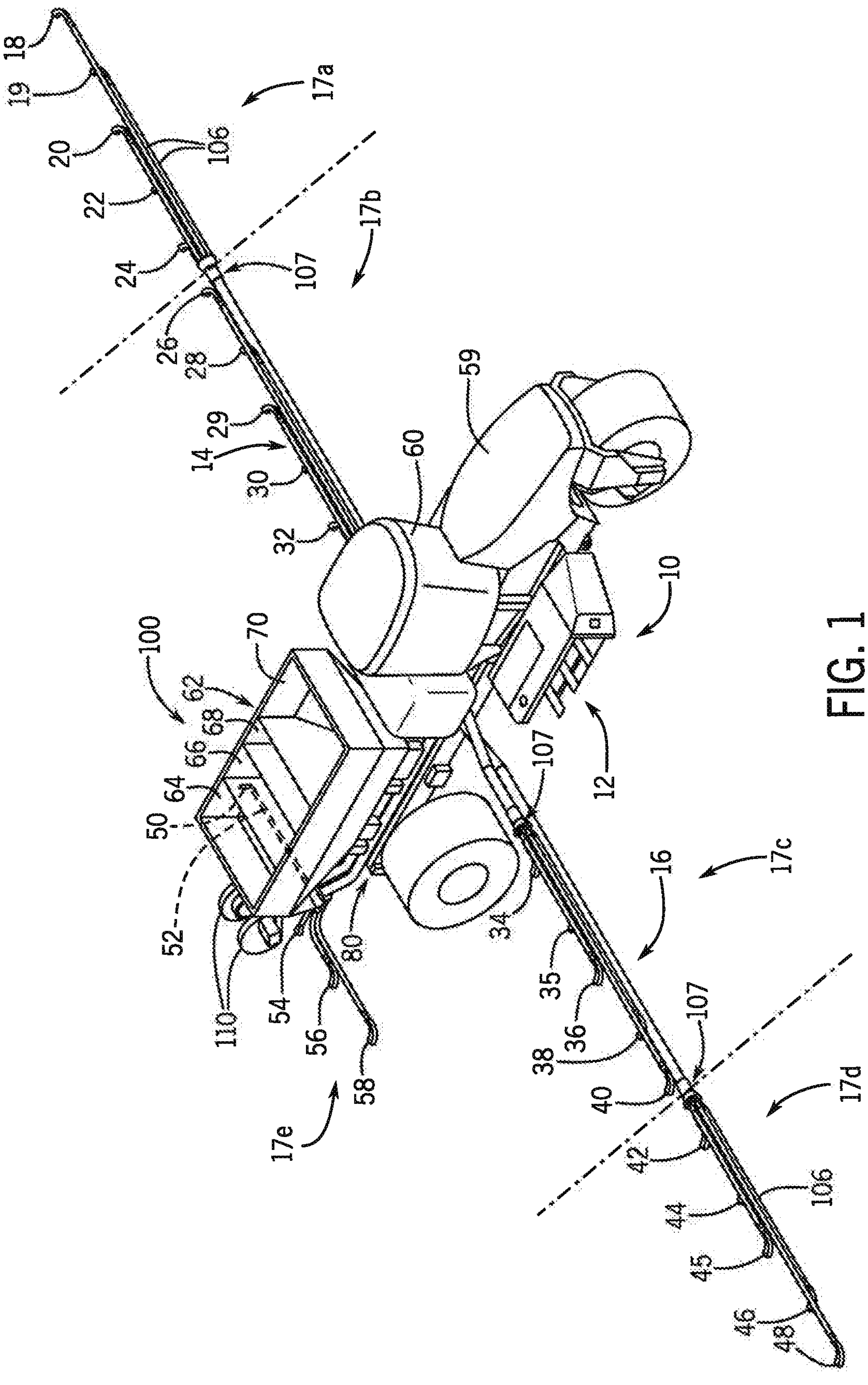
FIG. 1 illustrates an isometric view of an exemplary embodiment of an agricultural application implement in the form of a dry granular applicator, comprising a pneumatic conveying system in accordance with an aspect of the present invention.
Figure 2:
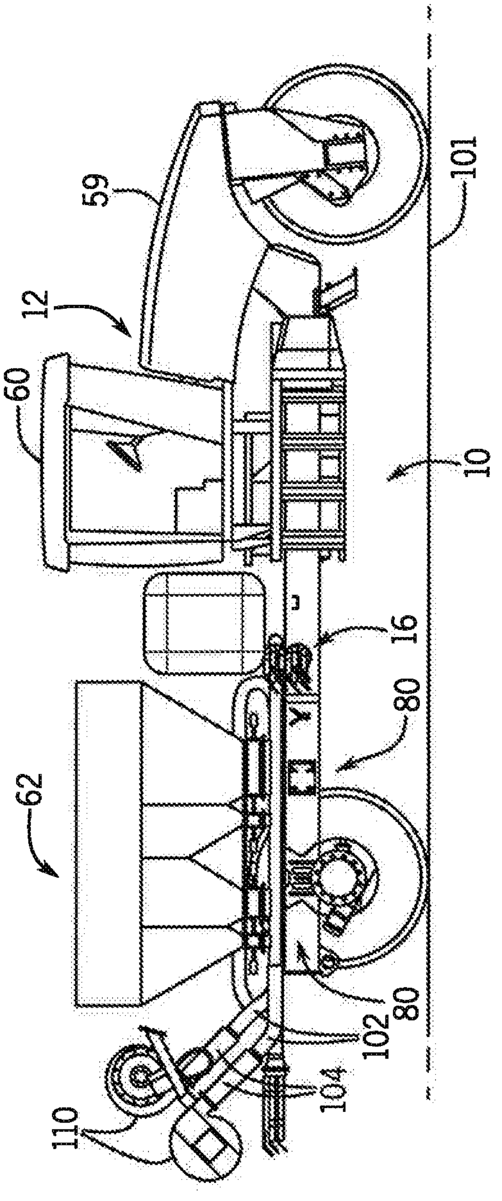
FIG. 2 illustrates a side elevation view of the applicator of FIG. 1, in accordance with an aspect of the present invention.

Referring now to the drawings, and more particularly to FIGS. 1 and 2, there is shown an agricultural application implement 10, on which a pneumatic conveying system 100 can be used. In the exemplary embodiment shown, application implement 10 is a dry pneumatic granular applicator. As is known in the art, applicator 10 generally includes a large wheeled transport unit 12 such as truck or tractor, and laterally extending particle delivery booms 14 and 16, which may be pivoted to a stowed position close to the implement for storage or transport. Each boom 14, 16 extends laterally from the applicator 10 in opposite directions. Each boom 14, 16 includes a plurality of boom sections 17, such as left outer and left inner boom sections 17*a*, 17*b* of boom 14, and right inner and right outer boom sections 17*c*, 17*d* of boom 16. Each boom section 17 is defined by a large diameter supply line 102 for supplying the boom section with granular or particulate material, such as seed, fertilizer, herbicide, insecticide and the like. Each boom section 17 includes a plurality of boom tubes or conduits terminating at particle delivering units, which for the applicator 10 are spreading outlets or nozzles. In the exemplary embodiment shown, left outer boom section 17*a* of boom 14 includes five nozzles 18, 19, 20, 22 and 24; left inner boom section 17*b* of boom 14 includes five nozzles 26, 28, 29, 30 and 32; right inner boom section 17*c* of boom 16 includes five nozzles 34, 35, 36, 38 and 40; and right outer boom section 17*d* of boom 16 includes five nozzles 42, 44, 45, 46 and 48. Additionally, at the back of applicator 10 there is a centrally mounted rear boom section 17*e* also defined by a large diameter supply line 102 for supplying the boom section with granular material. At the rear boom section 17*e* are five rear nozzles 50, 52, 54, 56 and 58 to provide full and complete coverage across the width of applicator 10, including the area between the inboard-most nozzles 32 and 34 of booms 14, 16. The rear boom section 17*e* allows spread of the particulate material/product over/onto the ground over which the applicator 10 passes for complete coverage. Although five boom sections 17, with five nozzles per boom section, is shown by way of example, in other aspects greater or fewer boom sections 17, and/or greater or fewer nozzles per boom section 17, can be provided within the scope of the invention.

Implement transport unit 12 can be self-propelled by an engine in an engine compartment 59 and can include an operator cab 60. In the exemplary embodiment shown, an uncovered tank 62 includes compartments 66 and 70 for carrying particulate material to be distributed in a metering section 80 for ultimate disbursement by nozzles 18-58. Further smaller compartments 64 and 68 are provided to supply micro-nutrients or other materials in the metering section 80. The supply of particulate in compartments 64, 66, 68, 70 can be replenished periodically from a supply vehicle (not shown).

As shown in FIGS. 1 and 2 by way of example, the compartments 64-70 of the tank 62 and the metering section 80 are disposed directly above the conveying system or assembly 100, which is a pneumatic conveying system 100. The system 100 includes multiple large diameter supply lines 102 that extend from a plenum 104 at one end, under the compartments 64-70 and terminate at the boom sections 17. At each boom section 17, the supply lines 102 and the particulate material or product transported therein are split by a suitable distribution structure or mechanism 107, such as a plurality of horizontal rotary distributors, among or into a number of secondary or smaller supply lines 106 that are connected to the nozzles 18-58.

To collect and drive the particulate material along the lines 102, fans 110 are operably connected to the plenums 104 opposite the inlet ends of lines 102 as described herein. The air flow from the fans 110 is directed from the fans 110 through the plenum 104 and into the respective lines 102 as a result of the structure of the plenum 104. After the air flow passes through the plenums 104 connected to the fans 110 and collects/entrains the particulate material from the compartments 64-70 via the metering section 80, the air flow continues to flow along each large diameter supply line 102, including with one or more 90° and/or 180° turns, to connect to the various booms sections 17. The fans 110 could be centrifugal fans that are 8 inches or less in diameter, and in some aspects, 6 inches or less.

Figure 3:
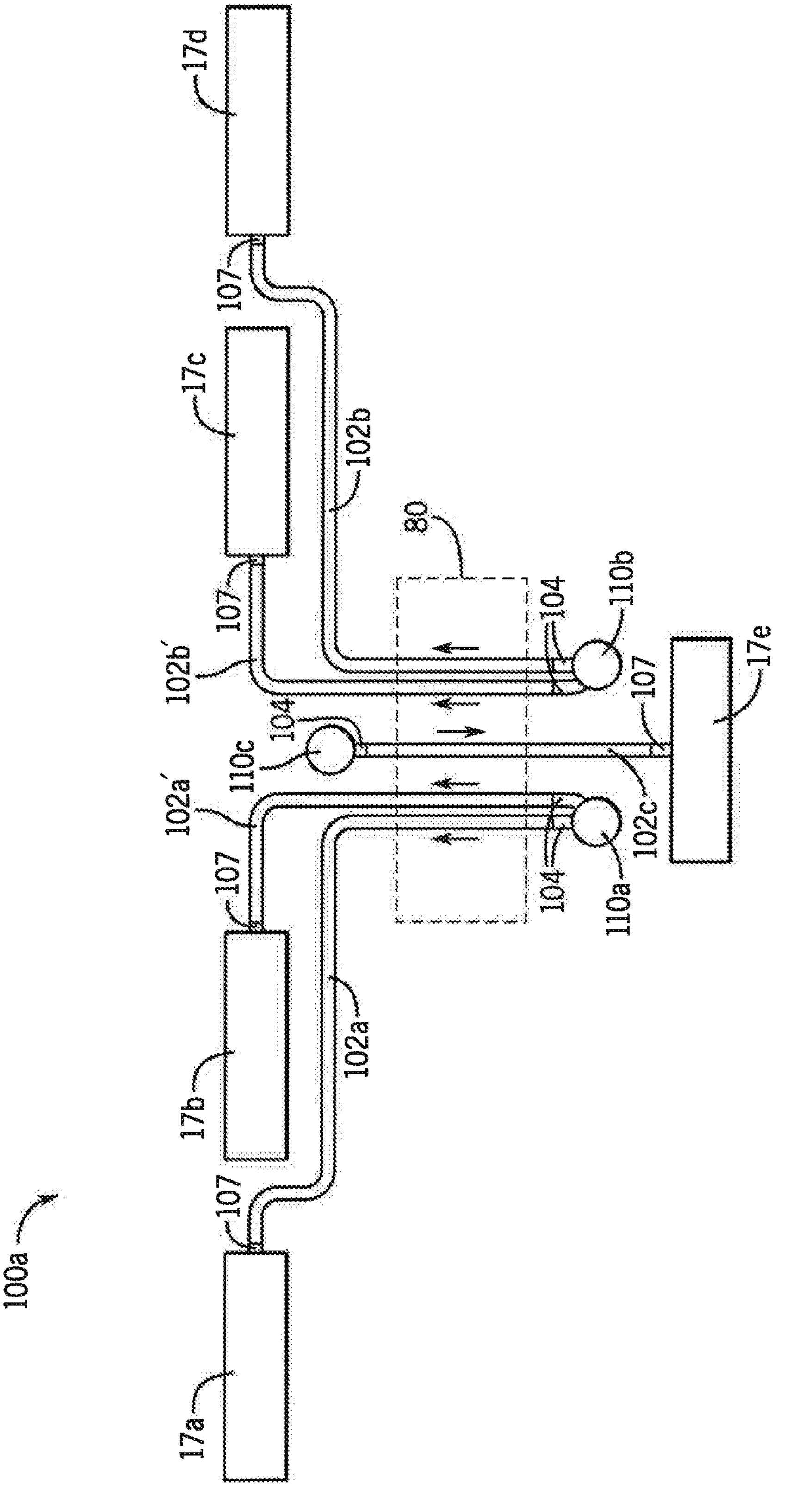
FIG. 3 illustrates the pneumatic conveying system of the applicator of FIG. 1 in accordance with a first aspect the present invention.

Referring now to FIG. 3, in a first aspect of the invention where like numerals indicate like elements throughout, a pneumatic conveying system 100*a* can include first, second and third fans 110*a*, 110*b* and 110*c*. The first fan 110*a* is configured to generate an airflow in supply lines 102*a* and 102*a*'. The supply lines 102*a* and 102*a*' receive the airflow and receive particulate material from the metering section 80 and entrain the particulate material in the airflow. The supply line 102*a*, in turn, provides the particulate material to the left outer inner boom section 17*a*, and the supply line 102*a*' provides the particulate material to and left inner boom section 17*b*, of boom 14. That is, the left outer and left inner boom sections 17*a*, 17*b* are tied together and operated by a single fan. Similarly, the second fan 110*b* is configured to generate an airflow in supply lines 102*b* and 102*b*'. The supply lines 102*b* and 102*b*' receive the airflow and receive particulate material from the metering section 80 and entrain the particulate material in the airflow. The supply line 102*b*, in turn, provides the particulate material to the right outer boom sections 17*d*, and the supply line 102*b*' provides the particulate material to the right inner boom section 17*c*, of boom 16. That is, the right inner and right outer boom sections 17*c*, 17*d* are also tied together and operated by a single fan. Also, the third fan 110*c* is configured to generate an airflow in a supply line 102*c*. The supply line 102*c* receives the airflow and receives particulate material from the metering section 80 and entrains the particulate material in the airflow. The supply line 102*c*, in turn, provides the particulate material to the rear boom section 17*e*. That is, the rear boom section 17*e* is operated by a single fan. As shown, the first and second fans 110*a*, 110*b* are each arranged rearward of the metering section 80 with the third fan 110*c* arranged forward of the metering section 80. However, in another aspect, any of or all of the first, second and third fans 110*a*, 110*b*, 110*c* can be arranged forward or rearward of the metering section 80.

Figure 4:
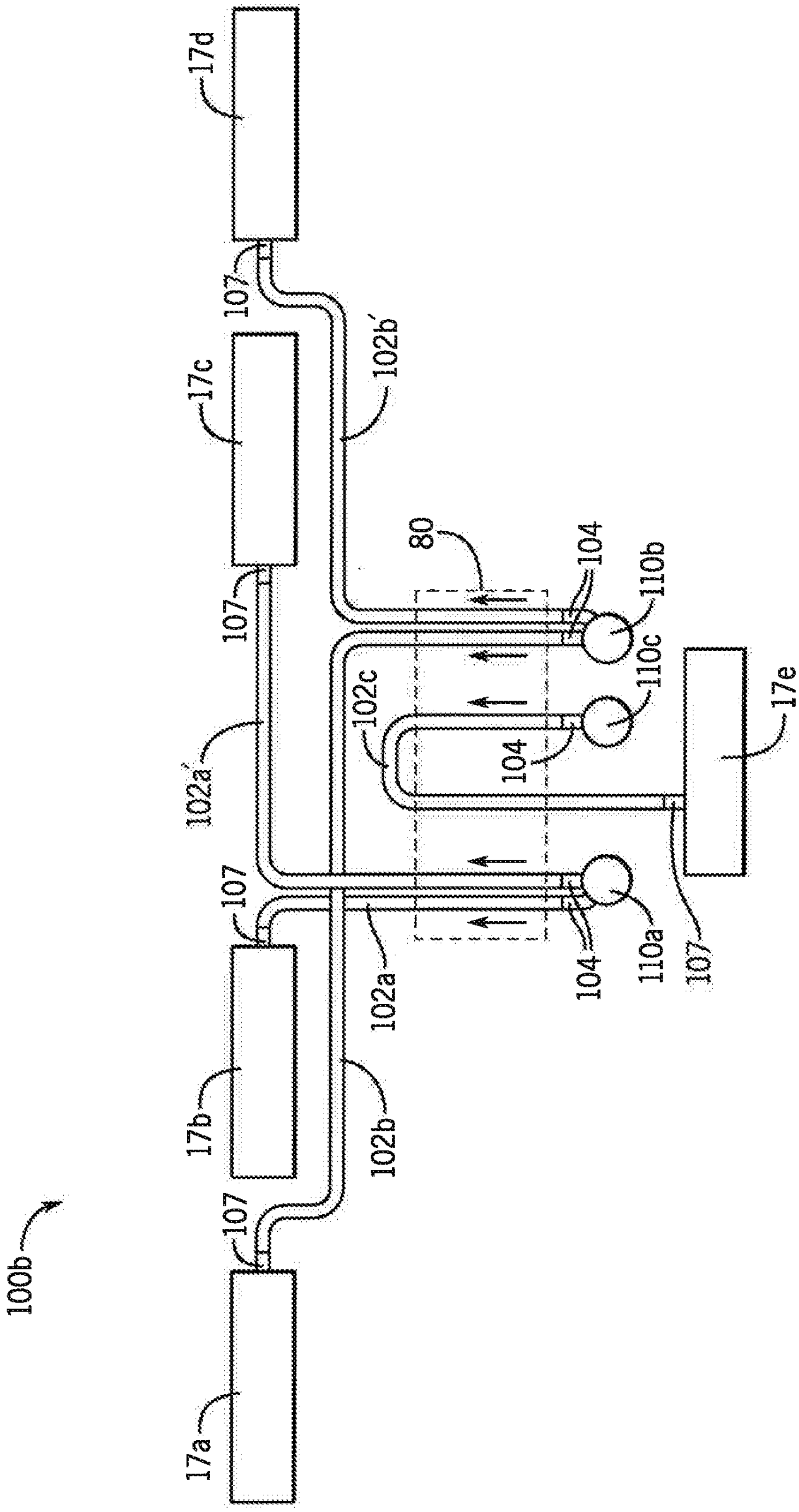
FIG. 4 illustrates the pneumatic conveying system of the applicator of FIG. 1 in accordance with a second aspect the present invention.

Referring now to FIG. 4, in a second aspect of the invention where like numerals indicate like elements throughout, a pneumatic conveying system 100*b* can include first, second and third fans 110*a*, 110*b* and 110*c*. The first fan

110*a* is configured to generate an airflow in supply lines 102*a* and 102*a*'. The supply line 102*a* and 102*a*' receive the airflow and receive particulate material from the metering section 80 and entrain the particulate material in the airflow. The supply line 102*a*, in turn, provides the particulate material to the left inner boom section 17*b*, and the supply line 102*a*' provides the particulate material to the right inner boom section 17*c*. That is, the inner boom sections are tied together and operated by a single fan. Similarly, the second fan 110*b* is configured to generate an airflow in a supply lines 102*b* and 102*b*'. The supply line 102*b* and 102*b*' receive the airflow and receive particulate material from the metering section 80 and entrain the particulate material in the airflow. The supply line 102*b*, in turn, provides the particulate material to the left outer boom section 17*a*, and the supply line 102*b*' provides the particulate material to the right outer boom section 17*d*. That is, the outer boom sections are tied together and operated by a single fan. Also, the third fan 110*c* is configured to generate an airflow in a supply line 102*c*. The supply line 102*c* receives the airflow and receives particulate material from the metering section 80 and entrains the particulate material in the airflow. The supply line 102*c*, in turn, provides the particulate material to the rear boom section 17*e*. That is, the rear boom section 17*e* is operated by a single fan. As shown, the first, second and third fans 110*a*, 110*b*, 110*c* are each arranged rearward of the metering section 80, with the supply line 102*c* including a 180° turn. However, in another aspect, any of or all of the first, second and third fans 110*a*, 110*b*, 110*c* can be arranged forward or rearward of the metering section 80.

Figure 5:
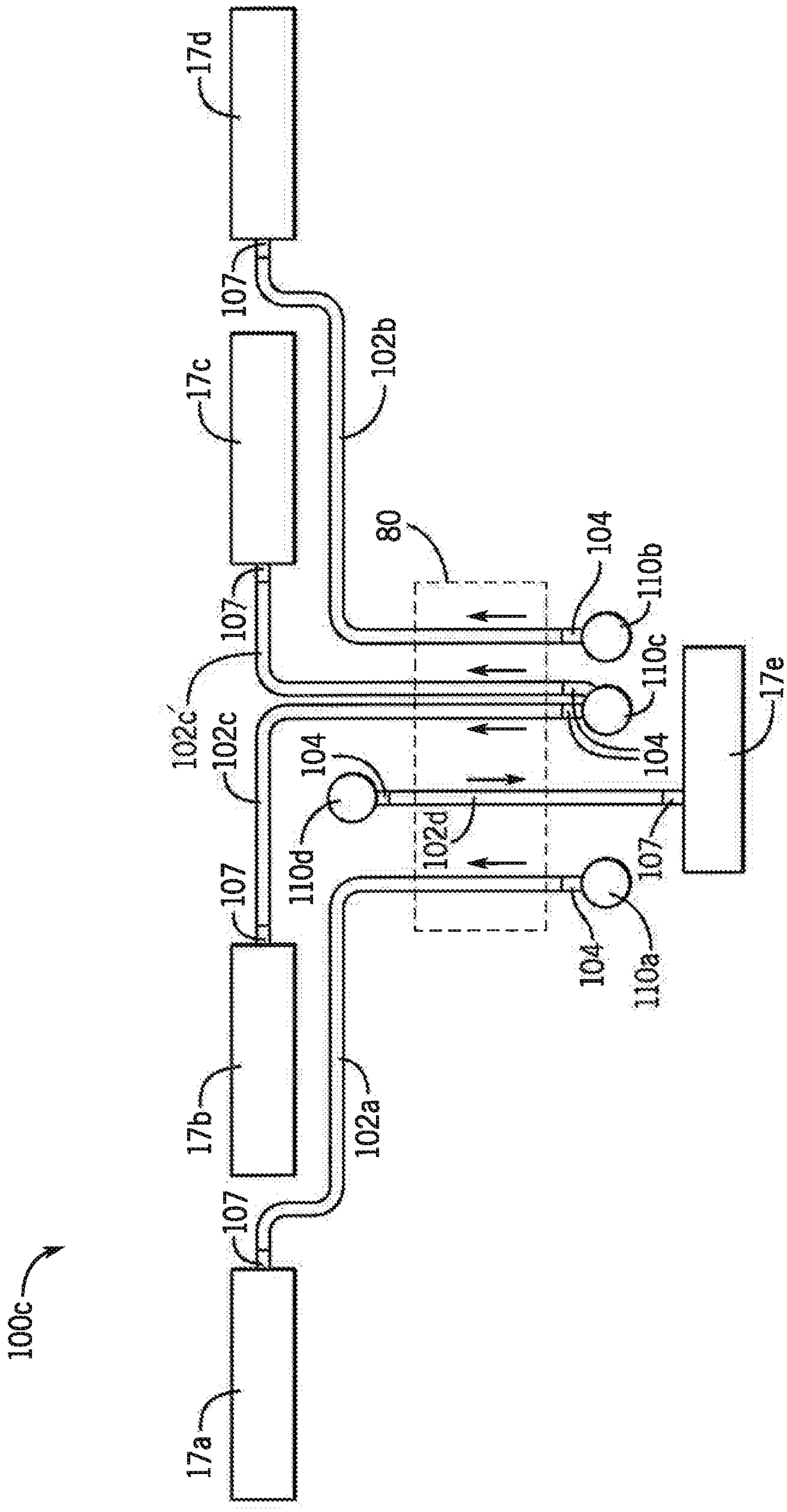
FIG. 5 illustrates the pneumatic conveying system of the applicator of FIG. 1 in accordance with a third aspect the present invention.

Referring now to FIG. 5, in a third aspect of the invention where like numerals indicate like elements throughout, a pneumatic conveying system 100*c* can include first, second, third and fourth fans 110*a*, 110*b*, 110*c* and 110*d*. The first fan 110*a* is configured to generate an airflow in a supply line 102*a*. The supply line 102*a* receives the airflow and receives particulate material from the metering section 80 and entrains the particulate material in the airflow. The supply line 102*a*, in turn, provides the particulate material to the left outer boom section 17*a* of boom 14. That is, the left outer boom section 17*a* is operated by a single fan. Similarly, the second fan 110*b* is configured to generate an airflow in a supply line 102*b*. The supply line 102*b* receives the airflow and receives particulate material from the metering section 80 and entrains the particulate material in the airflow. The supply line 102*b*, in turn, provides the particulate material to the right outer boom section 17*d* of boom 16. That is, the right outer boom sections 17*d* is operated by a single fan. The third fan 110*c* is configured to generate an airflow in supply lines 102*c* and 102*c*'. The supply lines 102*c* and 102*c*' receive the airflow and receive particulate material from the metering section 80 and entrain the particulate material in the airflow. The supply line 102*c*, in turn, provides the particulate material to the left inner boom section 17*b*, and the supply line 102*c*' provides the particulate material to the boom section 17*c*, of booms 14, 16, respectively. That is, the inner boom sections 17*b*, 17*c* are operated by a single fan. Also, the fourth fan 110*d* is configured to generate an airflow in a supply line 102*d*. The supply line 102*d* receives the airflow and receives particulate material from the metering section 80 and entrains the particulate material in the airflow. The supply line 102*d*, in turn, provides the particulate material to the rear boom section 17*e*. That is, the rear boom section 17*e* is operated by a single fan. As shown, the first, second and third fans 110*a*, 110*b*, 110*c* are each arranged rearward of the metering section 80 with the fourth fan 110*d* arranged forward of the metering section 80. However, in another aspect, any of or all of the first, second, third and fourth fans 110*a*, 110*b*, 110*c*, 110*d* can be arranged forward or rearward of the metering section 80.

Figure 6:
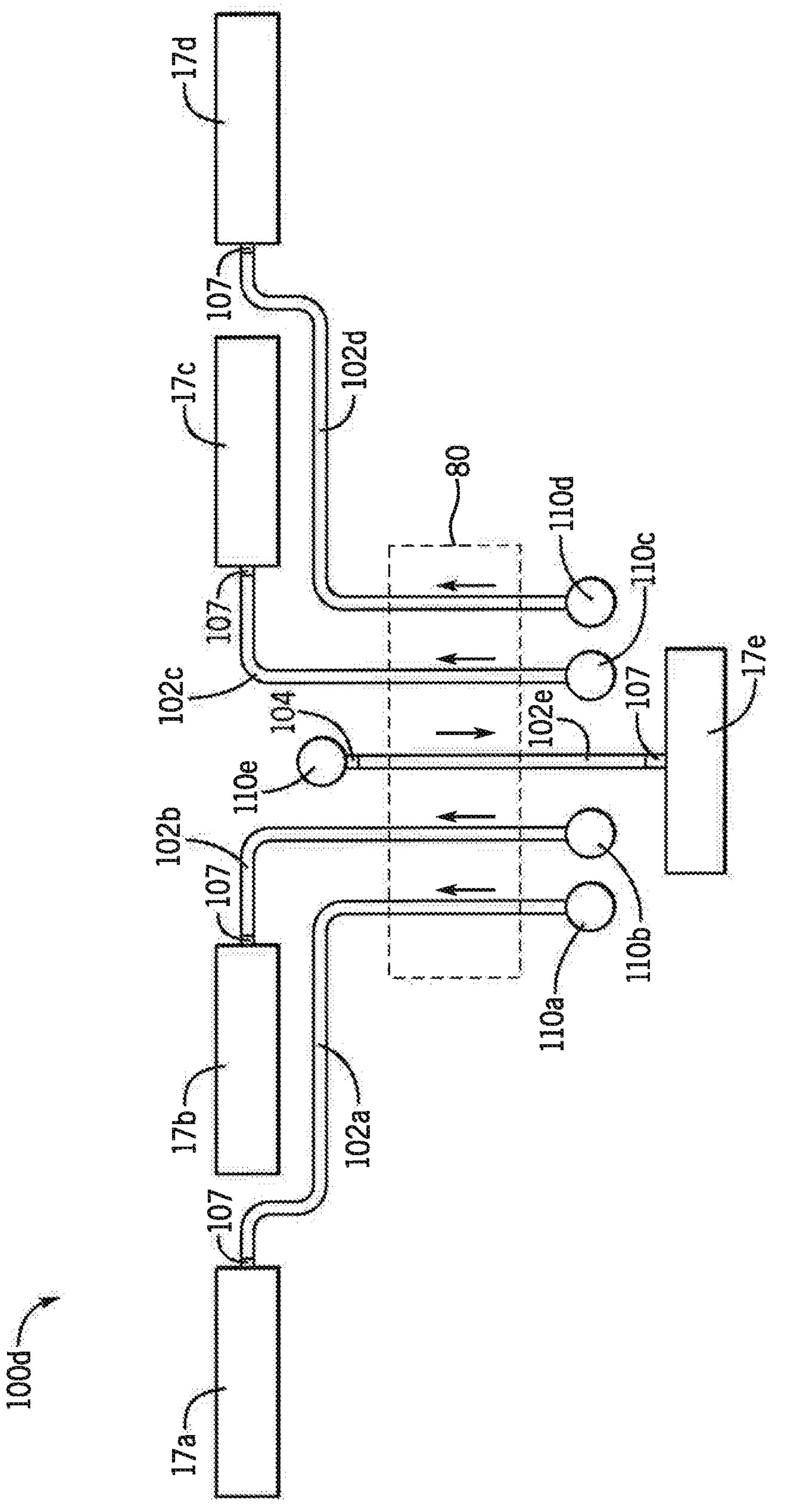
FIG. 6 illustrates the pneumatic conveying system of the applicator of FIG. 1 in accordance with a fourth aspect the present invention.

Referring now to FIG. 6, in a fourth aspect of the invention where like numerals indicate like elements throughout, a pneumatic conveying system 100*d* can include first, second, third, fourth and fifth fans 110*a*, 110*b*, 110*c*, 110*d* and 110*e*. The first fan 110*a* is configured to generate an airflow in a supply line 102*a*. The supply line 102*a* receives the airflow and receives particulate material from the metering section 80 and entrains the particulate material in the airflow. The supply line 102*a*, in turn, provides the particulate material to the left outer boom section 17*a* of boom 14. That is, the left outer boom section 17*a* is operated by a single fan. Similarly, the second fan 110*b* is configured to generate an airflow in a supply line 102*b*. The supply line 102*b* receives the airflow and receives particulate material from the metering section 80 and entrains the particulate material in the airflow. The supply line 102*b*, in turn, provides the particulate material to the left inner boom section 17*b* of boom 14. That is, the left inner boom section 17*b* is operated by a single fan. The third fan 110*c* is configured to generate an airflow in a supply line 102*c*. The supply line 102*c* receives the airflow and receives particulate material from the metering section 80 and entrains the particulate material in the airflow. The supply line 102*c*, in turn, provides the particulate material to the right inner boom section 17*c* of boom 16. That is, the right inner boom section 17*c* is operated by a single fan. The fourth fan 110*d* is configured to generate an airflow in a supply line 102*d*. The supply line 102*d* receives the airflow and receives particulate material from the metering section 80 and entrains the particulate material in the airflow. The supply line 102*d*, in turn, provides the particulate material to the right outer boom section 17*d* of boom 16. That is, the right outer boom section 17*d* is operated by a single fan. Also, the fifth fan 110*e* is configured to generate an airflow in a supply line 102*e*. The supply line 102*e* receives the airflow and receives particulate material from the metering section 80 and entrains the particulate material in the airflow. The supply line 102*e*, in turn, provides the particulate material to the rear boom section 17*e*. That is, the rear boom section 17*e* is operated by a single fan. Accordingly, in this aspect, each boom section 17 is operated by a single fan. As shown, the first, second, third and fourth fans 110*a*, 110*b*, 110*c*, 110*d* are each arranged rearward of the metering section 80 with the fifth fan 110*e* arranged forward of the metering section 80. However, in another aspect, any of or all of the first, second, third, fourth and fifth fans 110*a*, 110*b*, 110*c*, 110*d*, 110*e* can be arranged forward or rearward of the metering section 80.

Figure 7:
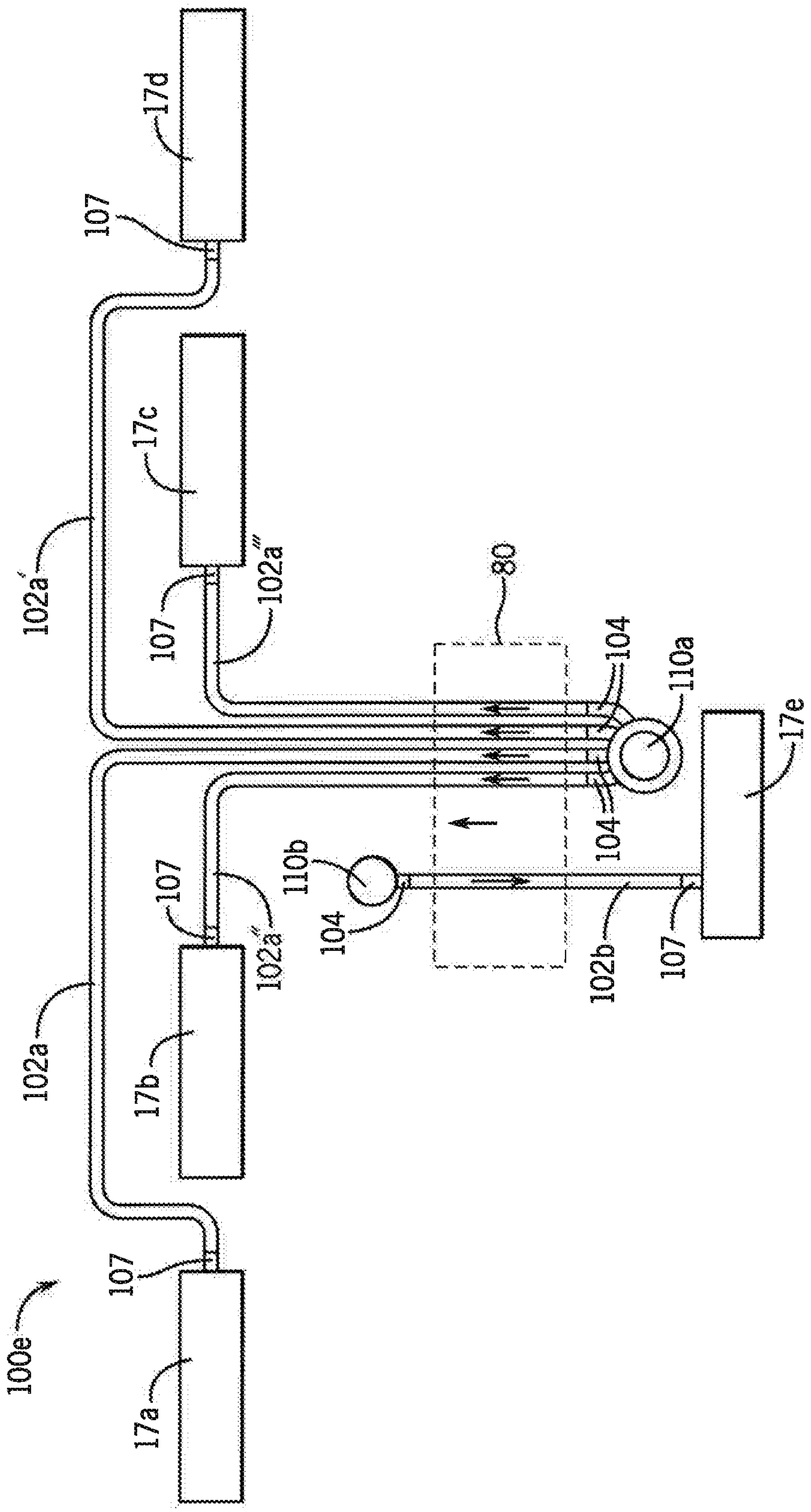
FIG. 7 illustrates the pneumatic conveying system of the applicator of FIG. 1 in accordance with a fifth aspect the present invention.

Referring now to FIG. 7, in a fifth aspect of the invention where like numerals indicate like elements throughout, a pneumatic conveying system 100*e* can include first and second fans 110*a*, 110*b*. The first fan 110*a* is a larger fan, such as 8 inches or more in outlet diameter, configured to generate a greater airflow in supply lines 102*a*, 102*a*', 102*a*" and 102*a*'". The supply lines 102*a*, 102*a*', 102*a*" and 102*a*'" receive the greater airflow and receive particulate material from the metering section 80 and entrain the particulate material in the greater airflow. The supply line 102*a*, in turn, provides the particulate material to the left outer boom section 17*a*, the supply line 102*a*' provides the particulate material to the right outer boom section 17*d*, the supply line 102*a*" provides the particulate material to the left inner boom section 17*b*, and the supply line 102*a*'" provides the particulate material to the right inner boom section 17*c*, of booms 14, 16. That is, the left and right, inner and outer boom sections 17*a*, 17*b*, 17*c*, 17*d* are tied together and operated by a single larger fan. The second fan 110*b* is a smaller fan, such as 6 inches or less in outlet diameter, configured to generate a lesser airflow in a supply line 102*b*. The supply line 102*b* receives the lesser airflow and receives particulate material from the metering section 80 and entrains the particulate material in the airflow. The supply line 102*b*, in turn, provides the particulate material to the rear boom section 17*e*. That is, the rear boom section 17*e* is operated by a single smaller fan. As shown, the first fan 110*a* is arranged rearward of the metering section 80 while the second fan 110*b* is arranged forward of the metering section 80. However, in another aspect, any of or all of the first, second fans 110*a*, 110*b* can be arranged forward or rearward of the metering section 80.

Figure 8:
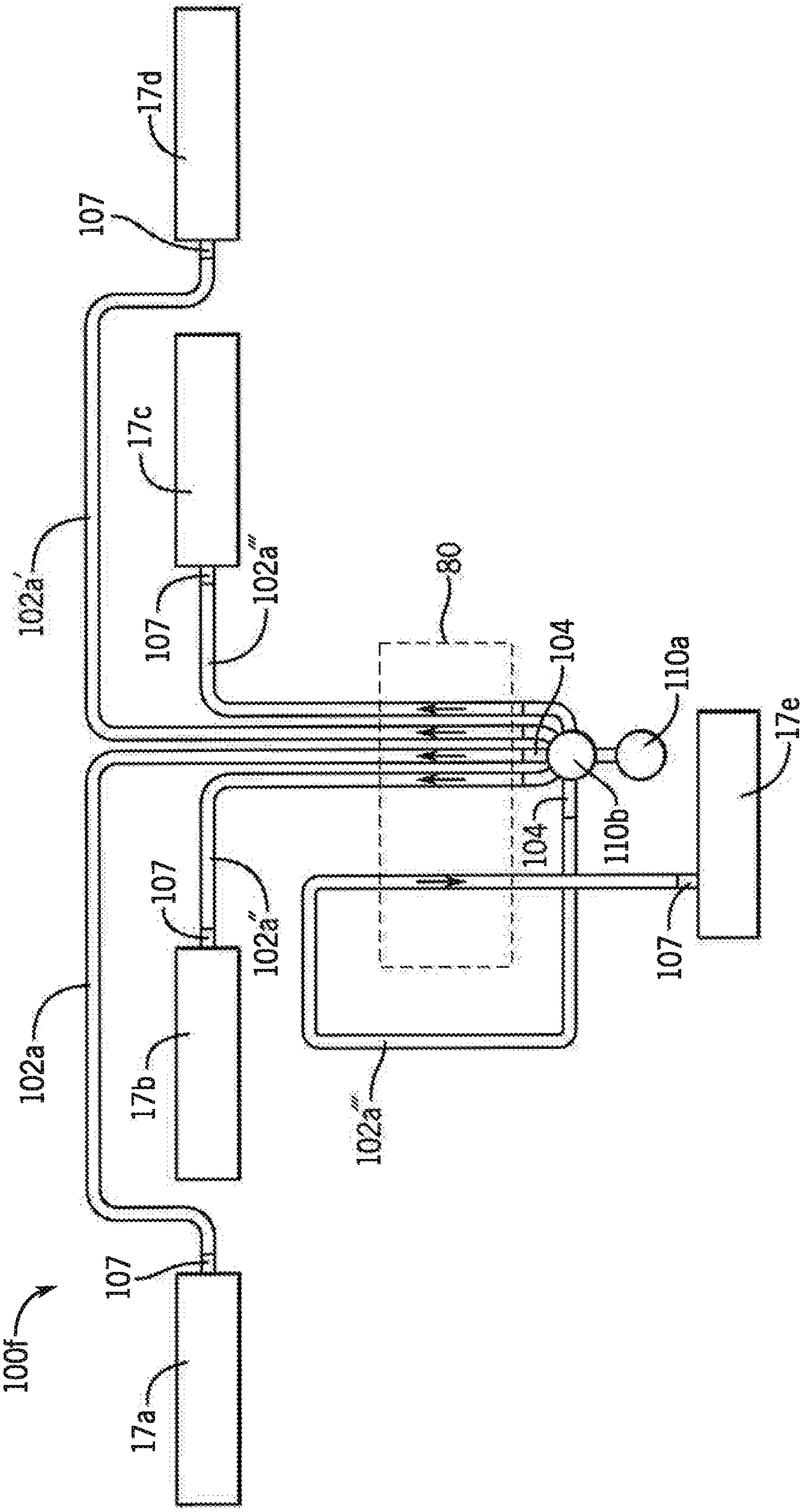
FIG. 8 illustrates the pneumatic conveying system of the applicator of FIG. 1 in accordance with a sixth aspect the present invention.

Referring now to FIG. 8, in a sixth aspect of the invention where like numerals indicate like elements throughout, a pneumatic conveying system 100*f* can include first and second fans 110*a*, 110*b*. The first and second fans 110*a*, 110*b* are configured to generate a greater airflow in supply lines 102*a*, 102*a*', 102*a*'', 102*a*''' and 102*a*''''. The greater airflow, produced by the first fan 110*a* supercharging the second fan 110*b* in series, is greater than either fan 110 might produce alone. The supply lines 102*a*, 102*a*', 102*a*'', 102*a*''' and 102*a*'''' receive the greater airflow and receive particulate material from the metering section 80 and entrain the particulate material in the greater airflow. The supply line 102*a*, in turn, provides the particulate material to the left outer boom sections 17*a*, the supply line 102*a*' provides the particulate material to the right outer boom section 17*d*, the supply line 102*a*'' provides the particulate material to the left inner boom section 17*b*, and the supply line 102*a*''' provides the particulate material to the right inner boom section 17*c*, of booms 14, 16, and the supply line 102*a*'''' provides the particulate material to the rear boom section 17*e*. That is, each of the boom sections 17 are tied together and operated by a single set of fans operating in series. As shown, the first and second fans 110*a*, 110*b* are each arranged rearward of the metering section 80. However, in another aspect, the first and second fans 110*a*, 110*b* can be arranged forward of the metering section 80.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may occur to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

These and other advantages of the present invention will be apparent to those skilled in the art from the foregoing specification. Accordingly, it is to be recognized by those skilled in the art that changes or modifications may be made to the above-described embodiments without department from the broad inventive concepts of the invention. It is to be understood that this invention is not limited to the particular embodiments described herein, but it is intended to include all changes and modifications that are within the scope and spirit of this invention.

What is claimed is:

1. A pneumatic conveying system for an agricultural product applicator, the pneumatic conveying system comprising:

a plurality of fans, each fan being configured to generate an airflow;

a plurality of supply lines, each supply line being configured to receive an airflow from a given fan of the plurality of fans and entrain particulate material in the airflow; and a plurality of boom sections, each boom section being connected to a supply line of the plurality of supply lines for receiving an airflow and entrained particulate material, each boom section comprising a plurality of nozzles for distributing the particulate material to the ground;

wherein the plurality of fans comprises first and second fans, the plurality of supply lines compromises first and second supply lines connected to the first and second fans, and the plurality of boom sections comprises first and second boom sections connected to the first and second supply lines, respectively, and wherein the first boom section extends in a first lateral direction from the product applicator and the second boom section extends in a second lateral direction from the product applicator that is opposite to the first lateral direction;

wherein the plurality of fans further comprises a third fan, the plurality of supply lines further comprises a third supply line connected to the third fan, and the plurality of boom sections further comprises a third boom section connected to the third supply line, respectively, and wherein the third boom section is a rear boom section that is centrally mounted with respect to the product applicator.

2. The pneumatic conveying system of claim 1, further comprising a metering section, wherein the first and second fans are each arranged rearward of the metering section for entraining the particulate material and the third fan is arranged forward of the metering section for entraining the particulate material.

3. The pneumatic conveying system of claim 2, further comprising a metering section, wherein all of the first, second and third fans are arranged forward or rearward of the metering section for entraining the particulate material.

4. The pneumatic conveying system of claim 1, wherein the plurality of boom sections further comprises a third boom section connected to the first supply line and a fourth boom section connected to the second supply line, and wherein the third boom section extends with the first boom section in the first lateral direction and the fourth boom section extends with the second boom section in the second lateral direction.

5. The pneumatic conveying system of claim 1, wherein the plurality of boom sections further comprises a third boom section connected to the second supply line and a fourth boom section connected to the first supply line, and wherein the third boom section extends with the first boom section in the first lateral direction and the fourth boom section extends with the second boom section in the second lateral direction.

6. The pneumatic conveying system of claim 1, wherein each fan of the plurality of fans is a centrifugal fan that is less than 8 inches in outlet diameter.

7. A pneumatic conveying system for an agricultural product applicator, the pneumatic conveying system comprising:
- a plurality of fans, each fan being configured to generate an airflow;
- a plurality of supply lines, each supply line being configured to receive an airflow from a given fan of the plurality of fans and entrain particulate material in the airflow; and
- a plurality of boom sections, each boom section being connected to a supply line of the plurality of supply lines for receiving an airflow and entrained particulate material, each boom section comprising a plurality of nozzles for distributing the particulate material to the ground;
- wherein the plurality of fans comprises first and second fans, the plurality of supply lines comprises first and second supply lines connected to the first and second fans, and the plurality of boom sections comprises first and second boom sections connected to the first and second supply lines, respectively, and wherein the first boom section extends in a first lateral direction from the product applicator and the second boom section extends in a second lateral direction from the product applicator that is opposite to the first lateral direction;
- wherein the plurality of fans further comprises a third and fourth fans, the plurality of supply lines further comprises a third and fourth supply lines connected to the third and fourth fans, and the plurality of boom sections further comprises a third and fourth boom sections connected to the third and fourth supply lines, respectively, and wherein the third boom section extends with the first boom section in the first lateral direction and the fourth boom section extends with the second boom section in the second lateral direction.

8. The pneumatic conveying system of claim 7, wherein the plurality of fans further comprises a fifth fan, the plurality of supply lines further comprises a fifth supply line connected to the fifth fan, and the plurality of boom sections further comprises a fifth boom section connected to the fifth supply line, respectively, and wherein the fifth boom section is a rear boom section that is centrally mounted with respect to the product applicator.

9. The pneumatic conveying system of claim 8, further comprising a metering section, wherein the first, second, third and fourth fans are each arranged rearward of the metering section for entraining the particulate material and the fifth fan is arranged forward of the metering section for entraining the particulate material.

10. The pneumatic conveying system of claim 8, further comprising a metering section, wherein all of the first, second, third, fourth and fifth fans are arranged forward or rearward of the metering section for entraining the particulate material.

11. A pneumatic conveying system for an agricultural product applicator, the pneumatic conveying system comprising:
- a plurality of fans, each fan being configured to generate an airflow;
- a plurality of supply lines, each supply line being configured to receive an airflow from a given fan of the plurality of fans and entrain particulate material in the airflow; and a plurality of boom sections, each boom section being connected to a supply line of the plurality of supply lines for receiving an airflow and entrained particulate material, each boom section comprising a plurality of nozzles for distributing the particulate material to the ground;

wherein the plurality of fans comprises first and second fans, the plurality of supply lines comprises first and second supply lines connected to the first and second fans, and the plurality of boom sections comprises first and second boom sections connected to the first and second supply lines, respectively, and wherein the first fan is larger to generate a greater airflow and the second fan is smaller to generate a lesser airflow.

12. The pneumatic conveying system of claim 11, wherein the first boom section extends laterally with respect to the product applicator and the second boom section is a rear boom section that is centrally mounted with respect to the product applicator.

13. The pneumatic conveying system of claim 12, wherein the plurality of boom sections further comprises a third boom section connected to the first supply line, and wherein the third boom section also extends laterally with respect to the product applicator.

14. The pneumatic conveying system of claim 13, wherein the plurality of boom sections further comprises fourth and fifth boom section connected to the first supply line, wherein the first and third boom sections extend in a first lateral direction from the product applicator and the fourth and fifth boom sections extend in a second lateral direction from the product applicator that is opposite to the first lateral direction.

15. A pneumatic conveying system for an agricultural product applicator, the pneumatic conveying system comprising:
- a plurality of fans, each fan being configured to generate an airflow, each fan being in series with one another;
- a supply line, the supply line being configured to receive airflow from the plurality of fans and entrain particulate material in the airflow; and
- a plurality of boom sections, each boom section being connected to the supply line for receiving the airflow and entrained particulate material, each boom section comprising a plurality of nozzles for distributing the particulate material to the ground.

16. The pneumatic conveying system of claim 15, wherein the plurality of boom sections comprises first and second boom sections, and wherein the first boom section extends in a first lateral direction from the product applicator and the second boom section extends in a second lateral direction from the product applicator that is opposite to the first lateral direction.

17. The pneumatic conveying system of claim 16, wherein the plurality of boom sections further comprises a third boom section, and wherein the third boom section is a rear boom section that is centrally mounted with respect to the product applicator.

18. The pneumatic conveying system of claim 17, wherein the plurality of boom sections further comprises fourth and fifth boom section, and wherein the first and fourth boom sections extend in the first lateral direction and the second and fifth boom sections extend in the second lateral direction.

* * * * *